(No Model.)
D. N. LE BALLISTER.
BICYCLE BRAKE.
No. 605,728. Patented June 14, 1898.
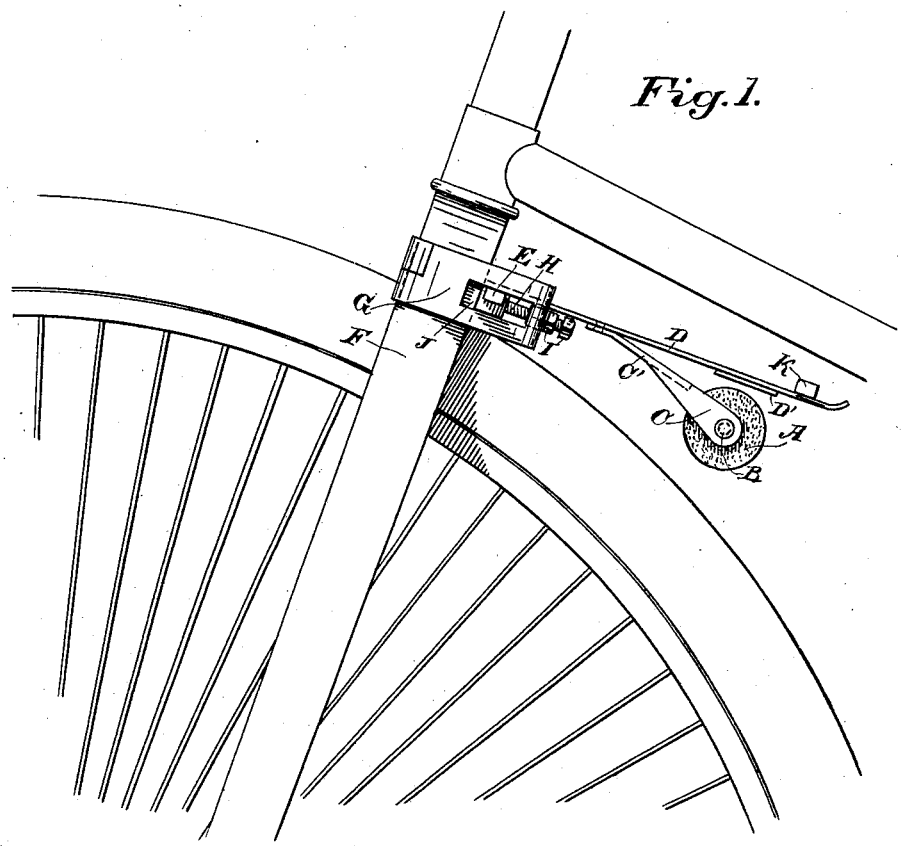
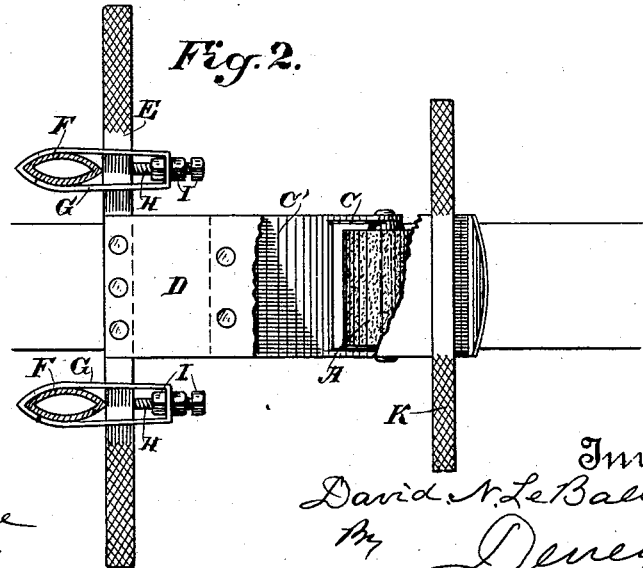
Witnesses:
Inventor
David N. Le Ballister

UNITED STATES PATENT OFFICE.

DAVID N. LE BALLISTER, OF FORT BRAGG, CALIFORNIA, ASSIGNOR, BY MESNE ASSIGNMENTS, TO DANIEL H. HAYNE AND ARTHUR D. STEBBINS, OF BALTIMORE, MARYLAND.

BICYCLE-BRAKE.

SPECIFICATION forming part of Letters Patent No. 605,728, dated June 14, 1898.

Application filed November 1, 1895. Serial No. 567,631. (No model.)

*To all whom it may concern:*

Be it known that I, DAVID N. LE BALLISTER, a citizen of the United States, residing at Fort Bragg, county of Mendocino, State of California, have invented an Improvement in Bicycle-Brakes; and I hereby declare the following to be a full, clear, and exact description of the same.

My invention relates to an improvement in brakes for bicycles.

It consists in the employment of a cylindrical roller journaled so as to be movable between the tire of the wheel and a frictional plate, against which the upper part of it forms contact when it is applied, so as to act upon the tire with a rolling friction and a retarding effect.

It also consists in certain details of construction, which will be more fully explained by reference to the accompanying drawings, in which—

Figure 1 is a side elevation showing the application of my device. Fig. 2 is a plan view.

In the application of brakes to bicycles it has been customary to employ either a spoon brake-shoe having a rubbing friction, or if rollers have been used a concaved surface, or else rollers standing at an angle with the plane of rotation of the wheel. In either of these cases a considerable friction and wear upon the tire is involved by reason of the points of contact of the rollers being at different distances from the center of rotation.

In my invention I employ a cylindrical roller A made of fiber or other suitable hard material, and the roller is mounted to rotate upon a shaft B, the ends of which are fixed in suitable supporting-plates C. These plates may be formed in one piece, with an elongated elastic steel plate C', which is stamped out of sheet-steel, and these side plates or lugs turned down upon each side by a press or in other suitable manner and perforated to receive the ends of the roller-shaft, which are riveted therein, the roller turning loosely upon the shaft. The plate C' is riveted or otherwise secured to a main plate D, and one end of this plate D is secured to a transverse bar E, which serves as a foot-rest. This bar and foot-rest E project to either side of the front forks F of the machine to a sufficient distance for convenience in supporting the rider's feet when desired. This brake may be so attached that the plate and roller extend in front of the forks and may be actuated by a plunger-rod from the usual hand-lever, or it may extend rearwardly and be actuated by the pressure of the foot.

In order to secure the bar E to the forks F, as illustrated in the latter form, I have shown a plate stamped out of sheet-steel and having tongues formed at one end, so that when the plate is bent these tongues fold around the front of the fork F upon each side. The sides G of the plate extend rearwardly, and where the transverse portion which unites their rear ends is formed it is perforated to receive a screw H, which passes through suitable nuts I, and the point bears against the bar E.

The bar E passes through an elongated slot J, so that its front edge will form contact with the rear edge of the fork F. One of these devices is fitted to the bar E upon each side of the plate D, and they are easily applied by separating the front ends of G when it has been moved forward far enough to cause the overlapping hook-shaped flanges to engage the front edge of the fork. When it has been pushed over the fork by separating these ends, they are then brought so as to clasp upon opposite sides of the fork, and by turning the screws H so as to press the bar E strongly against the rear edge of the fork the whole device is locked to it at a position near the top of the fork, thus allowing the plate D to extend rearwardly above the wheel. To the rear end of the plate D is fixed a shorter bar K, so that the foot of the rider may be applied conveniently to this bar, although it could be applied to the plate itself.

When the brake is to be applied, the rider may rest his feet upon the front bar E, and the heel or rear portion of the foot can be depressed, so as to force the bar K and plate D downwardly until the roller A is forced against the rim or tire of the wheel, and the upper part of the roller, by reason of the elasticity of the spring-plate C', will be forced into contact with the frictional plate D', which is removably secured to the lower surface of the plate D.

The plate D' can be removed at any time and a new one substituted when desired.

It will be seen that by this construction the roller A is really only an idler situated between the rim of the wheel and the plate D, the shaft serving to hold it in position and prevent its being forced out of place when it is in contact with the wheel for the purposes of a brake. The pressure brought upon the roller may be increased to any desired degree. The friction upon the rubber surface of the tire will be such as to prevent the roller slipping upon the tire, while the friction against the metal plate D' will cause such a rubbing and retarding action as will be transmitted to check the rotation of the wheel of the bicycle. As soon as the foot is raised sufficiently the elasticity of the plate D will raise it above the tire of the wheel, while the elasticity of the plate C' will at the same time move the roller away from the plate D', and it will then remain suspended between the wheel and this plate.

The friction of the roller upon its axle or shaft and the wear thereon are of no special importance, as the real work is done by the compression of the roller between the tire and the frictional plate above, the shaft serving to keep the roller from being moved out of its place. This transfers the wear from the tire to the plate above.

The whole device can be easily removed by turning the screws H backwardly until they are entirely clear of the bar E, and the elongated slots J allow the parts G to be moved forward with relation to the forks until the hook or overlapping front ends are clear of the forks, when the sides G can be separated and the device slipped off the forks, being replaced in the same manner as previously described.

If the device is to be fixed to the front forks to be operated by a hand-lever, it is only necessary to reverse the attachment, so that it extends to the front, and to connect the vertically-movable plates with the plunger of the hand-lever.

It will be manifest that the same arrangement of roller and pressure-plate can be adapted to the rear wheel, if preferred, and to other vehicles, and actuated by any of the well-known devices for applying wheel-brakes.

Having thus described my invention, what I claim as new, and desire to secure by Letters Patent, is—

1. In a bicycle-brake, the combination of a spring brake-lever, an arm fixed to the brake-lever, a roller carried by the arm, the brake-lever having a part engaging the roller, to retard the rotation thereof, and an operating device connected with that part of the brake-lever which engages the roller.

2. In a bicycle-brake, a flat spring-plate fixedly suspended at one end from the frame of the machine and having its opposite end free and adapted to be depressed, a second flat spring-plate secured at one end to the first-named plate and having its outer portion turned to form side lugs, a roller mounted to turn between said lugs and suspended between the tire and the under side of the first-named plate, and normally out of contact with both, and means whereby the free end of the first-named plate may be depressed to force one side of the roller into contact with the tire and simultaneously bring its own wearing-surface into contact with the opposite side of the roller.

3. In a bicycle-brake, a roller turnable upon a shaft which is fixed to an elastic plate, a main plate extending substantially parallel with and fixed to and overhanging the first-named plate, having a wearing-surface upon the lower side, said roller being normally out of contact with the wearing-surface of the main plate, a transverse bar, to the central portion of which the main plate is secured, while the ends project so as to form foot-rests, and a clamp in which the transverse bar is movable horizontally and by which the bar and plate are secured to the forks of the machine.

4. In a bicycle-brake, an elastic plate fixed to a transverse foot-rest and having a wearing-surface upon the lower side, a roller turnable upon a shaft which is fixed to a supplemental spring-plate, said plate being fixed to the main plate so that the roller is suspended between the main plate and the wheel of the machine, a mechanism for adjustably securing the device to the forks of the bicycle consisting of inclosing plates adapted to fit and clasp each of the forks, slots made in said plates through which the foot-rest bar extends and in which it is movable horizontally, screws turnable in nuts at the rear of the clamping-plate, the points of said screws pressing against the bar and adapted to force it against the forks so to clamp it securely thereon.

In witness whereof I have hereunto set my hand.

DAVID N. LE BALLISTER.

Witnesses:
S. H. NOURSE,
JESSIE C. BRODIE.